April 1, 1947.  S. P. NEMETH  2,418,274
HELICOPTER ROTOR VANE FOR BALANCING SIDE THRUST OF ANTI-TORQUE DEVICES
Filed Dec. 20, 1944   3 Sheets-Sheet 1
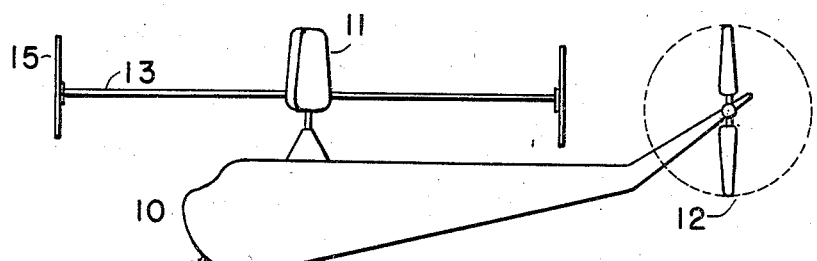
FIG. 1
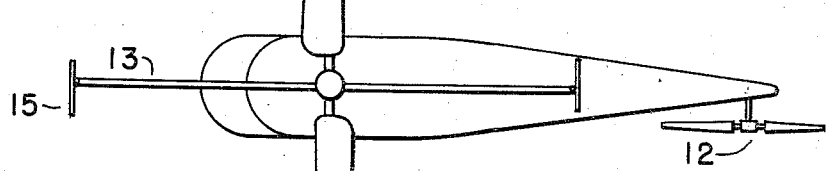
FIG. 2
FIG. 3
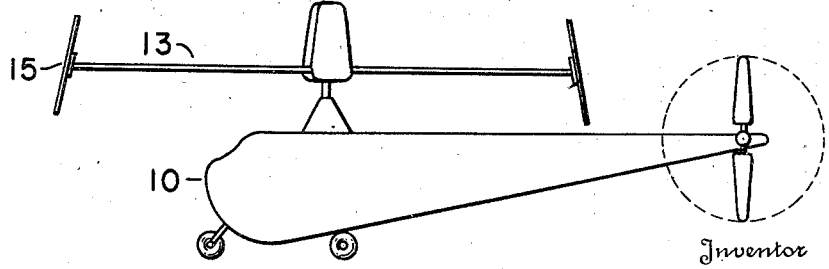
Inventor
S. P. NEMETH
By
Attorney April 1, 1947.  S. P. NEMETH  2,418,274
HELICOPTER ROTOR VANE FOR BALANCING SIDE THRUST OF ANTI-TORQUE DEVICES
Filed Dec. 20, 1944  3 Sheets-Sheet 2

Inventor
S.P. NEMETH

By Max W. Munk
Attorney

April 1, 1947.                    S. P. NEMETH                    2,418,274
HELICOPTER ROTOR VANE FOR BALANCING SIDE THRUST OF ANTI-TORQUE DEVICES
Filed Dec. 20, 1944                          3 Sheets-Sheet 3

Inventor
S. P. NEMETH

By Max M. Menk
Attorney

Patented Apr. 1, 1947

2,418,274

UNITED STATES PATENT OFFICE 2,418,274

HELICOPTER ROTOR VANE FOR BALANCING SIDE THRUST OF ANTITORQUE DEVICES

Stephan P. Nemeth, Chicago, Ill.

Application December 20, 1944, Serial No. 569,075

4 Claims. (Cl. 244—17)

This invention relates to helicopters sustained by a single driven rotor and requiring means for balancing the driving couple of the rotor. This driving couple is generally balanced by the moment of the side thrust of a tail propeller facing the direction of motion of the rotor blades in their rearward position. The lack of balance of moments is thus removed, but a new balancing requirement is introduced. It becomes necessary to balance the thrust of the tail propeller by a side force of equal magnitude acting in opposite direction. This is ordinarily accomplished by tilting the rotor, using thus the rotor for creating both, a large sustaining and a smaller side force.

Such use of the rotor is feasible, but unsatisfactory. The dual function of the rotor leads to complications in the steering and the controlling of the helicopter, whereby it becomes unduly difficult to pilot the craft. Utilizing the rotor in this manner calls for almost acrobatic skill, and makes it much more difficult to fly a helicopter than to fly an airplane. Thereby it becomes also accordingly more dangerous to pilot a helicopter.

It is the object of the present invention to relieve the rotor from its auxiliary function of having to create a side force in ordinary straight flight, so that the flying may become easier and safer. According to the invention, this is accomplished by the provision of anti-thrust airfoils or fins, spaced from the rotor axis and mounted to rotate about the same in synchronism with the rotor blades. It is preferred that their incidence angle be periodically changed in synchronism with the rotor revolution, so that they may produce a side force during a larger portion of their circular path.

It is accordingly the object of the invention to provide a helicopter with side force producing fins.

It is also an object to provide such rotor with side force producing fins, predominantly in vertical or axial spanwise direction, and operating at periodically changing incidence angle in phase with the rotor revolutions.

These and other objects and advantages of the present invention will now be described in the specification and illustrated in the accompanying drawings, certain preferred embodiments being disclosed by way of illustration only, for, since the underlying principles may be incorporated in other specific devices, it is not intended to be limited to the ones here shown, except as such limitations are clearly imposed by the appended claims.

In the drawings like numerals refer to similar parts throughout the several views, of which:

Fig. 1 represents the elevational side view of a helicopter,

Fig. 2 represents the top view of the same helicopter,

Fig. 3 represents the elevational side view of a second helicopter,

Figure 4:
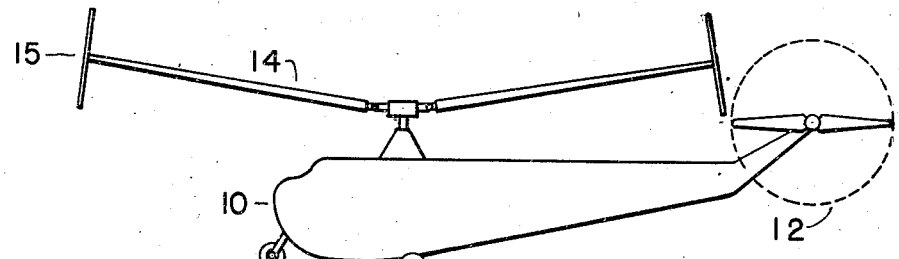
Fig. 4 represents the elevational side view of a third helicopter.
Figure 5:
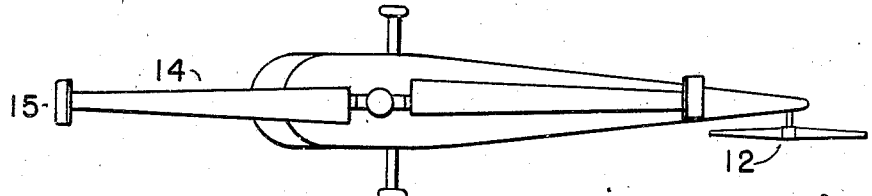
Fig. 5 represents the top view of this latter helicopter.

Turning now to these drawings, there are shown helicopters having a fuselage 10, a sustaining rotor 11, with rotor blades 14, and a torque balancing propeller 12. In accordance with the present invention, all helicopters are provided with fins 15. In the helicopters Figs. 1 to 3, to which also refer Figs. 6 and 7, said fins 15 are mounted on separate fin arms 13 projecting from and rotating with the rotor hub 16. In the helicopter Figs. 4 and 5, to which also refer Figs. 8 and 9, said fins 15 are mounted directly on the rotor blades 14. The anti-torque propeller 12 of the helicopter Fig. 1 is substantially at the height of the rotor 11. It is then preferred to arrange the fins 15 substantially parallel to the rotor axis. The anti-torque propeller of the helicopter Fig. 3 is below the rotor 11. It is then preferred to slant the fins 15 downwardly and outwardly, lest the fin forces and the propeller forces combine to form an unbalanced rolling couple.

Figure 6:
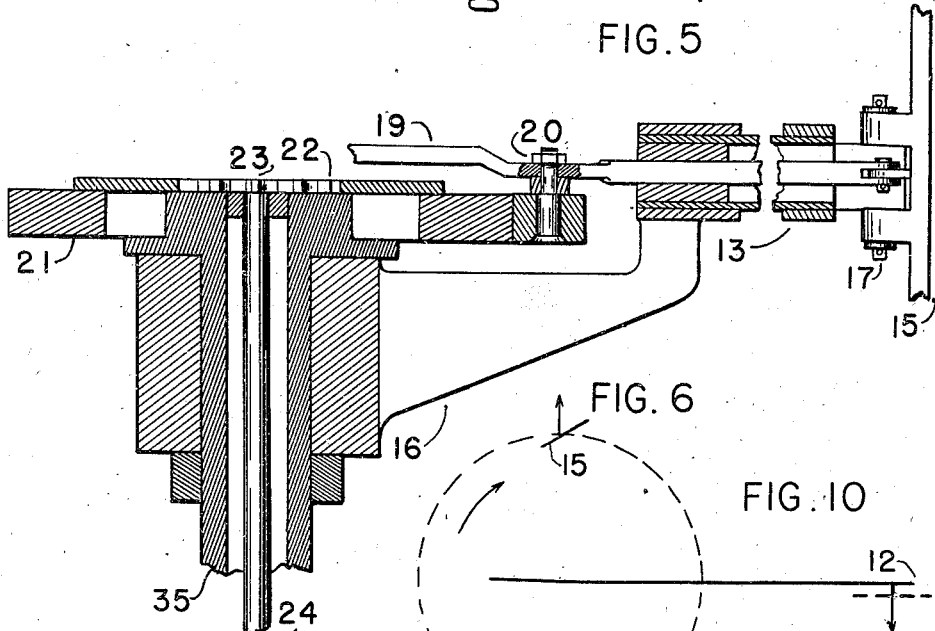
Fig. 6 represents a sectional elevational view of the rotor of the first and second helicopter.
Figure 7:
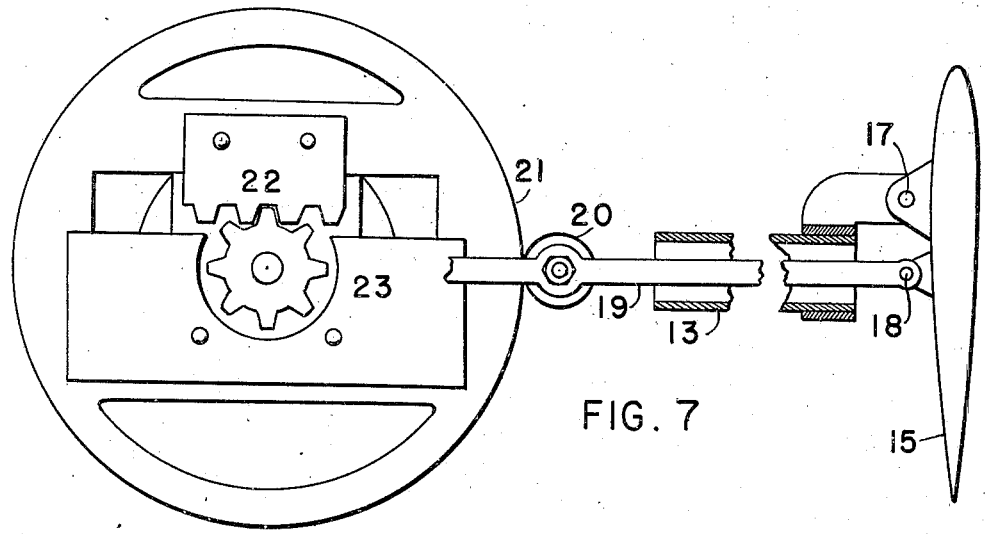
Fig. 7 represents the top view of the same rotor.

We proceed now to the mechanical details. Fins 15 are wing section contoured airfoils, rotating about the rotor axis their rounded leading edge ahead. Their lift is predominantly horizontal. Its magnitude and direction depends on the angle of incidence of the fins relative to the air. Their angle of incidence with respect to their support is periodically altered. For that purpose, fins 15 are hingedly mounted at 17 for rotation about an axis parallel in substance to the rotor axis and to the fin span. In the design of Figs. 6 and 7, each momentary angular position of fin 15 is determined by a control rod 19, hinged to the fins 15 at points 18 and connecting the pair of opposite fins. The rod 19 is provided with a pair of cam followers 20 of which one only is depicted in the drawing. Said followers 20 are in operative engagement with the circular cam excenter disc 21 slidably mounted above the rotor hub 16. Disc 21 has rack gear teeth 22 in engagement with pinion 23 mounted at the end of control shaft 24. In other words, the excentricity of disc 21 is variable and under the control of the pilot. With each definite excentricity setting, the disc stands still, being mounted on the rotor mast 35. The disc is moved into excentric and substantially sidewise relation to the rotor axis.

Figure 10:
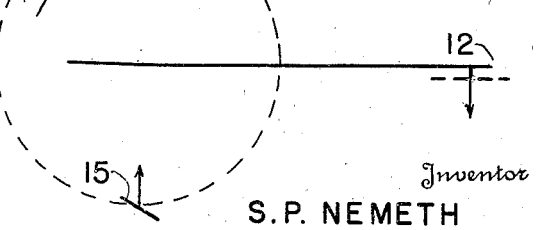
Fig. 10 is a diagram illustrating the directions and incidences which have to be explained.

The relative angular positions of the elements are diagrammatically indicated in Fig. 10. Fin 15 when on the left side of the fuselage produces a side force opposing the thrust of the propeller 12. It does so by being given an appropriate incidence in a manner well known. By virtue of this angle in conjunction with the relatively larger air speed at the left side when the fin is advancing, this determines the resultant fin force direction. It would determine it even with fixed fins. The effect is emphasized by giving the fins an opposite incidence as shown in Fig. 10. Both incidence angles, and thus the total effect is regulated by means of control shaft 24.

Figure 8:
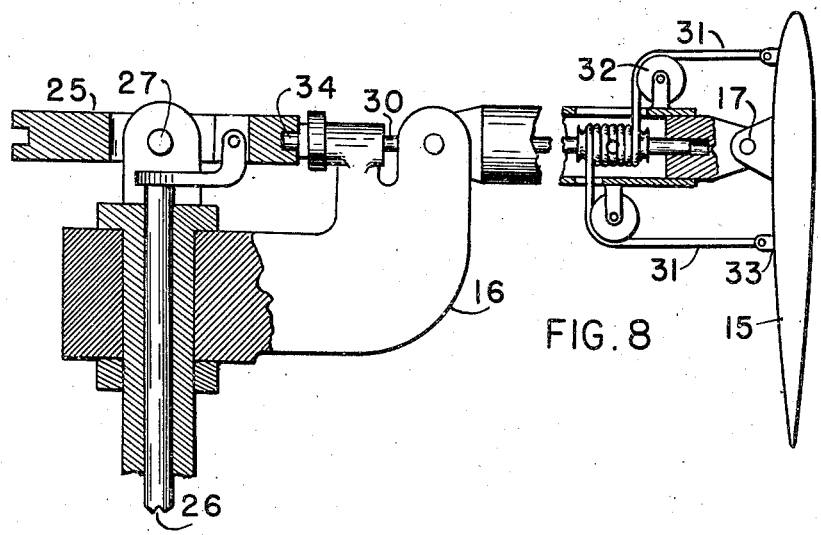
Fig. 8 represents a sectional elevational view of the rotor of the third helicopter.
Figure 9:
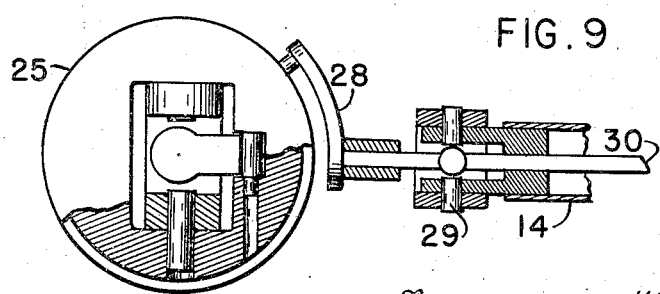
Fig. 9 represents the top view of this latter rotor.

The action of the mechanism of Figs. 8 and 9 is equivalent to that of the mechanism of Figs. 6 and 7. The fin incidence is now varied by means of cable 31 guided by pulleys 32, fastened to the fin at points 33, and wound about a shaft 30. Said shaft is articulated by a universal joint 29, so that it may take part in the flapping motion of blades 14 within which it is mounted. This possibility makes a shaft preferable to a slide rod. At its inner end, shaft 30 is provided with a crank lever 28, in operative engagement with a wabble plate 25, lever pin 34 being contained within a peripheral slot of the wabble plate. Said plate 25 is hingedly supported at 27 by the mast 35. Slide rod 26 is hinged to the plate and determines its inclination. Again, by displacing the control rod 26, the pilot controls the amplitude of the periodic angular displacement of the fin.

I have made experiments with such antithrust fins. The tests indicate a quiet operation and greatly improved control and operating characteristics of the helicopter.

I claim:

1. In combination with a helicopter having one driven sustaining rotor, airfoils spaced from the upward rotor axis predominantly upwardly and moderately inwardly extending, mounted and set for rotation with the rotor and for airfoil effects.

2. In combination with a helicopter having one driven sustaining rotor, airfoils spaced from the upward rotor axis predominantly upwardly and moderately inwardly extending, mounted and set for rotation with the rotor and for airfoil effects, and means for periodically varying the incidence angle of said airfoils in phase with the rotor revolutions.

3. In combination with a helicopter having one driven sustaining rotor, airfoils spaced from the upward rotor axis predominantly upwardly and moderately inwardly extending, mounted for rotation with the rotor, and means for periodically varying the incidence angle of said airfoils in synchronism with the rotor revolutions, dimensioned arranged and adjusted for airfoil suction effect at the rotor axis side while each airfoil executes its largest forward velocity and for airfoil pressure effect at the rotor axis side while each airfoil executes its largest rearward velocity.

4. In combination with a helicopter having one driven sustaining rotor, airfoils spaced from the upward rotor axis predominantly upwardly and moderately inwardly extending, mounted for rotation with the rotor, means for periodically varying the incidence angle of said airfoils in synchronism with the rotor revolutions, dimensioned arranged and adjusted for airfoil suction effect at the rotor axis side while each airfoil executes its largest forward velocity and for airfoil pressure effect at the rotor axis side while each airfoil executes its largest rearward velocity, and control means for varying the amplitude of said periodic variation.

STEPHAN P. NEMETH.

REFERENCES CITED

The following references are of record in the file of this patent:

UNITED STATES PATENTS

| Number | Name | Date |
|---|---|---|
| 2,364,496 | Vogel | Dec. 5, 1944 |
| 2,318,259 | Sikorsky | May 4, 1943 |
| 1,519,866 | Marchetti | Dec. 16, 1924 |

FOREIGN PATENTS

| Number | Country | Date |
|---|---|---|
| 816,979 | French | May 10, 1937 |